(12) United States Patent
Montagnino

(10) Patent No.: US 6,541,714 B2
(45) Date of Patent: Apr. 1, 2003

(54) SCALE WITH A HOLOGRAPHIC PROJECTOR

(75) Inventor: James G. Montagnino, St. Charles, IL (US)

(73) Assignee: Sunbeam Products, Inc., Boca Raton, FL (US)

( * ) Notice: Subject to any disclaimer, the term of this patent is extended or adjusted under 35 U.S.C. 154(b) by 91 days.

(21) Appl. No.: 09/904,781

(22) Filed: Jul. 13, 2001

(65) Prior Publication Data

US 2003/0010543 A1 Jan. 16, 2003

(51) Int. Cl.⁷ .............................................. G01G 23/32
(52) U.S. Cl. ............................ 177/178; 359/15; 345/7; 362/23
(58) Field of Search .............................. 359/15; 345/7; 362/23; 177/177, 178

(56) References Cited

U.S. PATENT DOCUMENTS

| 2,141,236 A | * | 12/1938 | Benedict | 177/178 |
| 2,937,862 A | * | 5/1960 | Williams | 177/178 |
| 3,512,594 A | * | 5/1970 | Grusin et al. | 177/178 |
| 3,547,212 A | * | 12/1970 | Grusin et al. | 177/178 |
| 4,364,442 A | * | 12/1982 | Flickinger | 177/177 |
| 4,534,365 A | * | 8/1985 | Bonetta et al. | 177/177 |
| 6,180,892 B1 | * | 1/2001 | Li | 177/178 |
| 6,268,572 B1 | * | 7/2001 | Wilson, Jr. | 177/177 |

* cited by examiner

Primary Examiner—Randy W. Gibson
(74) Attorney, Agent, or Firm—Kramer, Levin, Naftalis & Frankel LLP

(57) ABSTRACT

A scale with a holographic projector includes a weight measurement device and a holographic projector coupled to the weight measurement device. Activation of the weight measurement device activates the holographic projector that then projects in mid-air a holographic image indicative of a weight of an object being measured. Optionally, the scale may include a display coupled to the weight measurement device.

14 Claims, 5 Drawing Sheets

SCALE WITH A HOLOGRAPHIC PROJECTOR

FIELD OF THE INVENTION

The present invention relates to weight scales and more specifically to a scale having a holographic projector.

BACKGROUND INFORMATION

Weight scales are well-known in the art. A scale may use one of a variety of weighing mechanisms to measure weight, and most commonly-used weighing mechanisms require placement of the scale on a hard, flat surface such as a bathroom floor. A typical scale is kept flat on a bathroom floor. Many people weigh themselves in the privacy of their bathrooms before or after bathing. A pervasive feature of personal weight scales is a display or dial which indicates the weight information sought by the user.

Many people consider a scale to be a necessary bathroom appliance. In particular, individuals concerned with their weight tend to check their weight on a regular basis, and thus they will have a scale at home. Many of these individuals concerned with their weight may be overweight or of large stature and may experience difficulty viewing the scale display while standing. For example, an individual with a large, protruding stomach may not be able to see over the stomach to see the display. Someone else may have a bad back and experience unsteadiness when bending over to view the display.

Prior attempts to solve these problems used a scale with a vertical column supporting a dial display or electronic display of the user's weight. These scales commonly are referred to as beam scales and are found, for example, in locker rooms and doctor offices.

Additional attempts have been made to design scales with electronic displays separate from the scale that may be placed in front of the user. Such electronic displays may be connected by wires or by wireless RF telemetry. The separate electronic display may be mounted, for example, on the wall near the scale, permitting the user to look directly forward to see the weight measurement without attempting to view the scale itself.

However, whether using a beam scale or a detached display, the user must contend with having adequate space and tolerance for a scale that may be fairly obtrusive. For example, a beam scale cannot be stored easily in a cabinet out of sight, while a wall-mounted detached display may need to remain on the wall, detracting from the room's decor. Were a scale to use a standard optical projector to project the display onto a wall, this may require, however, the wall to have a solid, light, smooth background. Projection onto a dark, patterned, or textured surface may be significantly more difficult to read. Thus, although many people would prefer not to have a scale be predominant in their bathrooms these people simply may tolerate having an obtrusive scale for the lack of a better alternative. It would therefore be advantageous to have a scale that is compact and flat, without a beam or detachable display, but nonetheless permits a large user to read the weight measurement without bending over, and without the requirements of a standard optical projector.

SUMMARY OF THE INVENTION

The present invention provides a weight scale having a holographic projector that projects a holographic image at a predetermined distance from the platform, such as 3 to 4 feet. The holographic image would serve as a virtual three-dimensional display of the weight measurement. The holographic image would appear in mid-air and not need to be reflected by a solid, light, smooth background. The image preferably would be visible to a user without the user bending over to view it. The scale also could include, for example, a body fat monitor or body mass index measurement device.

A scale according to an exemplary embodiment of the present invention may include an upper surface upon which a user can stand, a weight measurement mechanism, and a holographic projector. During operation, as when a user is standing on the scale, the holographic projector emits a visible indication of the weight measured. In an exemplary embodiment, the holographic projector may project an alphanumeric holographic image. When not in use, the holographic projector may be dark and inactive.

DETAILED DESCRIPTION

Figure 1A:
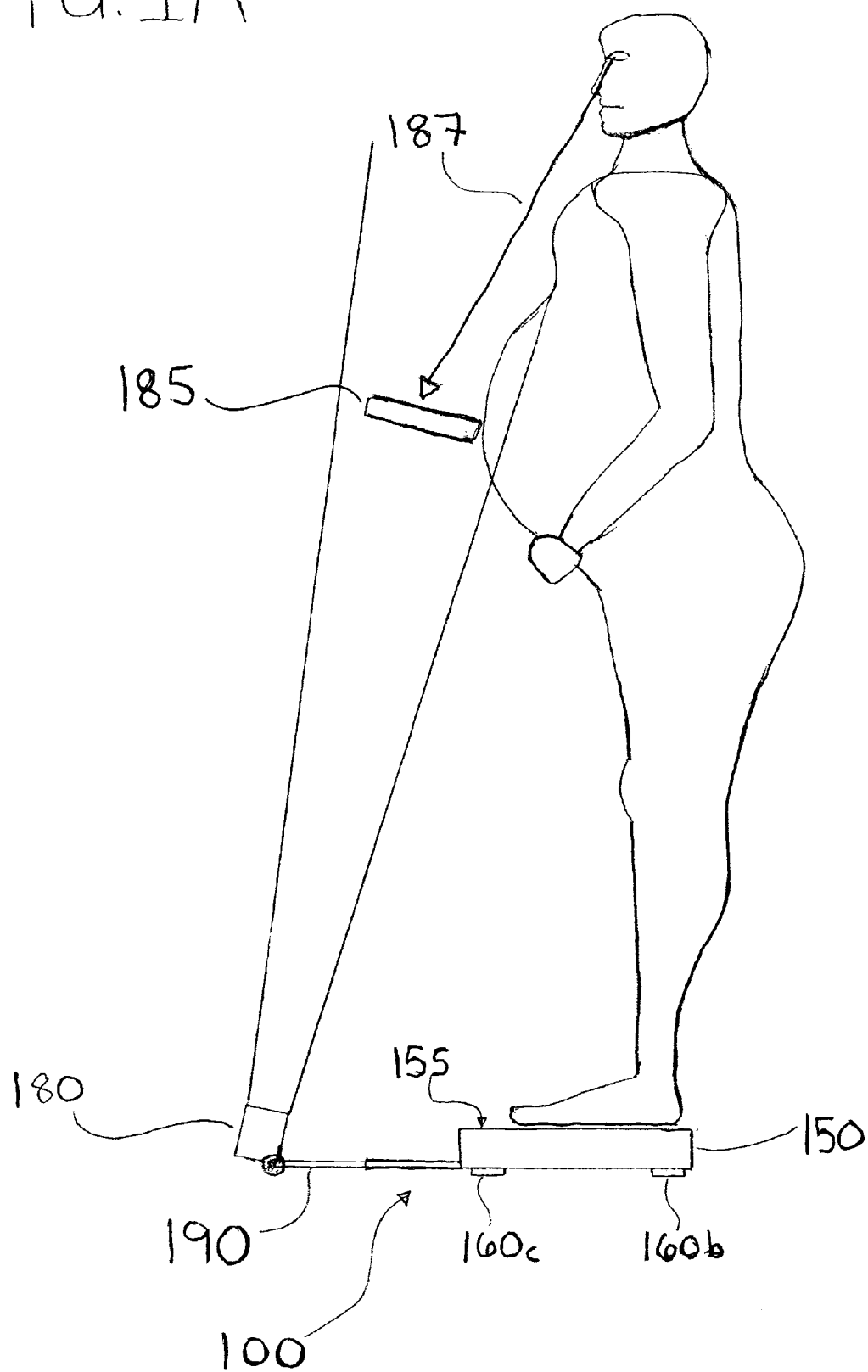
FIG. 1A is a left side elevational view of an exemplary embodiment of a weight scale according to the present invention having a user standing on the scale.

FIG. 1A shows a left side elevational view of an exemplary embodiment of a weight scale 100 in accordance with the present invention. The scale 100 may comprise an enclosure 150 having a substantially planar upper surface 155 upon which a user can stand. The upper surface 155 preferably may be uniformly styled and textured, such as smooth tinted plastic, so as not to be too conspicuous a scale. However, the upper surface 155 also may be patterned in a way so as to draw attention away from the function of the scale 100. Note that while the scales 100 shown in FIGS. 1A–1C are largely rectangular, the scales 100 may well be circular, oval, hexagonal, or any shape and size reasonably suited to operate as a scale.

Figure 1B:
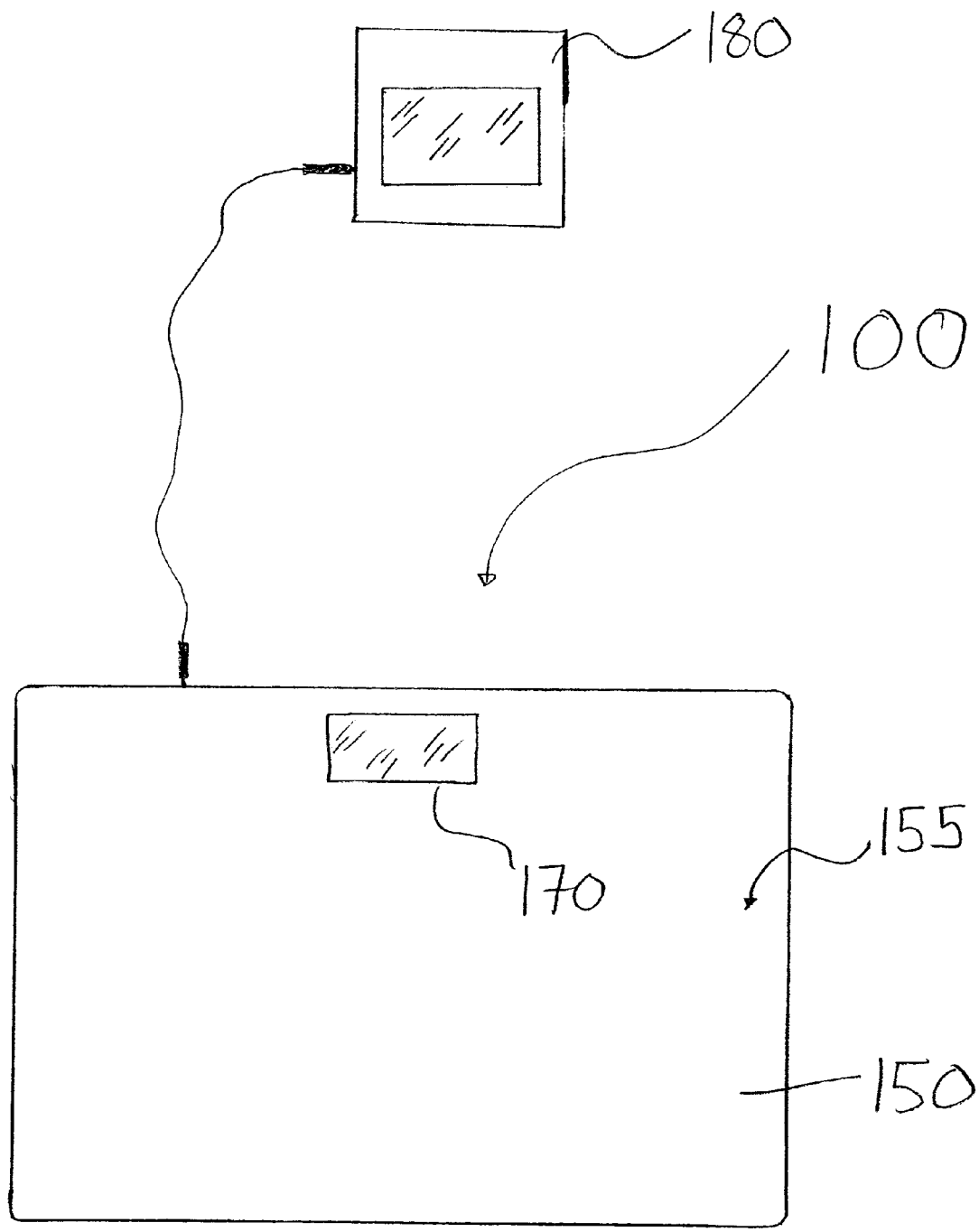
FIG. 1B is a plan view of another exemplary weight scale in inactive state.
Figure 1C:
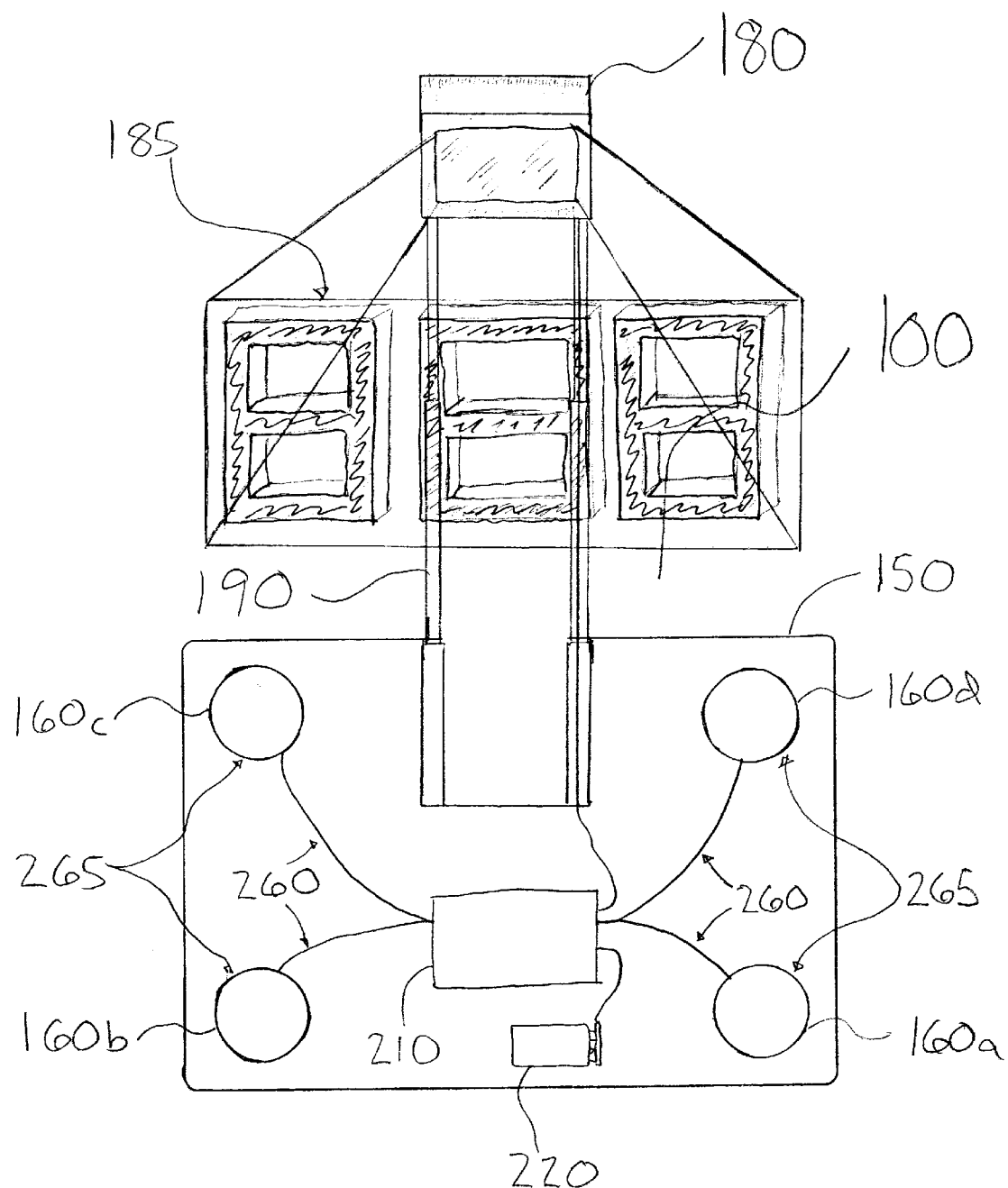
FIG. 1C is a partially cut away plan view of the exemplary weight scale of FIG. 1A in active state.

Referring to FIGS. 1B and 1C, the enclosure 150 may rest on four feet 160*a*–160*d* and may be coupled in known ways to weight sensing devices 265 such as load cells, strain gauges or the like. In an exemplary embodiment, the weight sensing devices 265 generate electrical signals indicative of the weight applied thereto. Conventional load cells and strain gauges known to those skilled in the art can be used in accordance with an embodiment of the present invention. The signals from the weight sensing devices 265 may then be processed to generate an indication of the applied weight. Exemplary circuitry for accomplishing this is described more fully below in connection with FIG. 2. The weight sensing devices also may include any other suitable weighing mechanism known in the art. The feet 160 may be adjustable for leveling purposes. The feet 160 may be simple pads, if using, for example, strain gauges, or they may be load cells if using electronic sensors.

The scale 100 optionally may include a conventional display 170 that preferably may be centered on the upper surface 155 of the enclosure 150. The display 170 may have a digital or analog format and may be electrical or mechanical. An electrical implementation of the display 170 may include, for example, a liquid crystal display (LCD) with back-lighting or a multi-segment light-emitting diode (LED) display. The characteristics of an LCD may be varied, such as having white lettering against a black background, black lettering against a white background, or black lettering against a color-tinted background (e.g., green, blue). Reversing the contrast on an LCD or varying the back-lighting may create additional desirable effects.

Moreover, the scale 100 according to an exemplary embodiment of the present invention includes a holographic projector 180. The holographic projector 180 may be coupled to a microcontroller 210 which in turn may be coupled to the weight sensing devices 265. The holographic projector 180 may be separate from the enclosure 150 and in communication with the microcontroller 210 via either wires or RF telemetry, as in FIG. 1B. FIG. 1B is a plan view of another exemplary weight scale, having a detached holographic projector 180 in inactive state. Alternatively, the projector 180 may be integral to the enclosure 150. The projector 180 may be integral in the sense that it is fixed within an elongated enclosure 150, or it may be integral in that it is extendable from and retractable to the enclosure 150, as in FIG. 1C. FIG. 1C is a partially cut-away plan view of the exemplary weight scale of FIG. 1A in active state.

The projector 180 preferably may be arranged in front of the scale 100 so that the images may be projected upward towards the user's field of vision 187. As the user stands on the scale 100, the projector 180 projects the holographic image 185 directly towards the user's field of vision 187. Because the light from the projector 180 is emitted upward at the user, the light of the holographic image 185 does not need to be reflected off a nearby surface to be seen. The projector 180 may be offset in front of the user so that the holographic image 185 is not obstructed by the user's protruding stomach, as shown in FIG. 1A. Moreover, to minimize the size of the scale 100, the projector 180 may be attached by a retractable slide mechanism 190, also as shown in FIGS. 1A and 1C, which may automatically extend, pivot and retract in accordance with the activation of the scale 100.

Based on the signals received from the weight sensing devices indicative of the weight measured, the microcontroller 210 may generate an alphanumeric rendering to be projected by the holographic projector 180 as a holographic image 185. The holographic projector 180 may include any suitable holographic projector known in the art, such as, for example, Application-Specific Integrated Filters (ASIFs) commercially available from DigiLens, holographic projection systems from Zebra Imaging, Digital Light-Processing (DLP) projectors, or the Holographic Optical Element (HOE) projection system as described in U.S. Pat. Nos. 6,175,431, and 6,211,976. To the extent reasonably feasibly, the enclosure 150 preferably may be self-contained and sealed against light entering from underneath, which might interfere with the holographic projector 180 in the active state.

Figure 2:
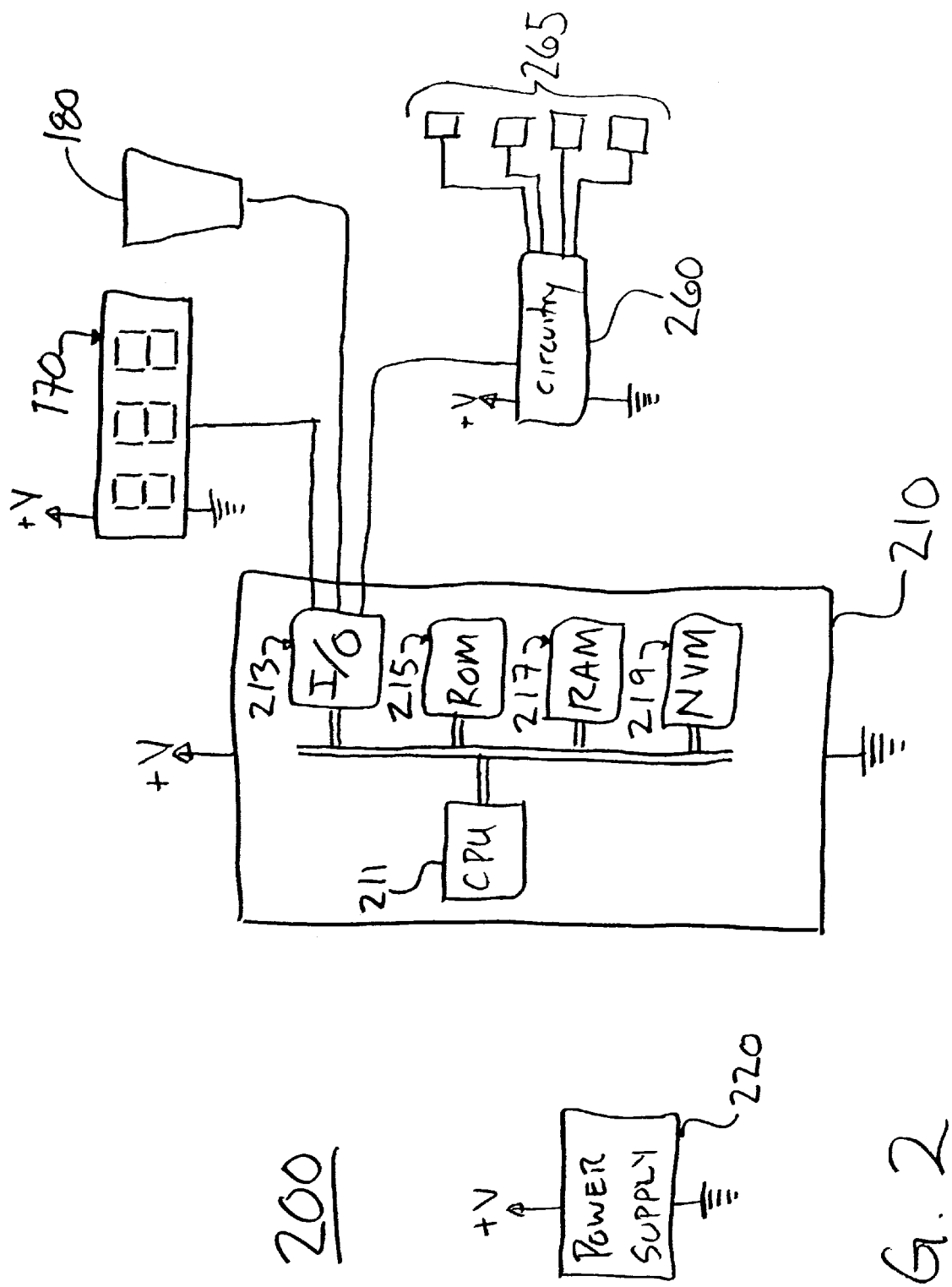
FIG. 2 is a schematic block diagram of the circuitry for an exemplary weight scale in accordance with the present invention.
Figure 3:
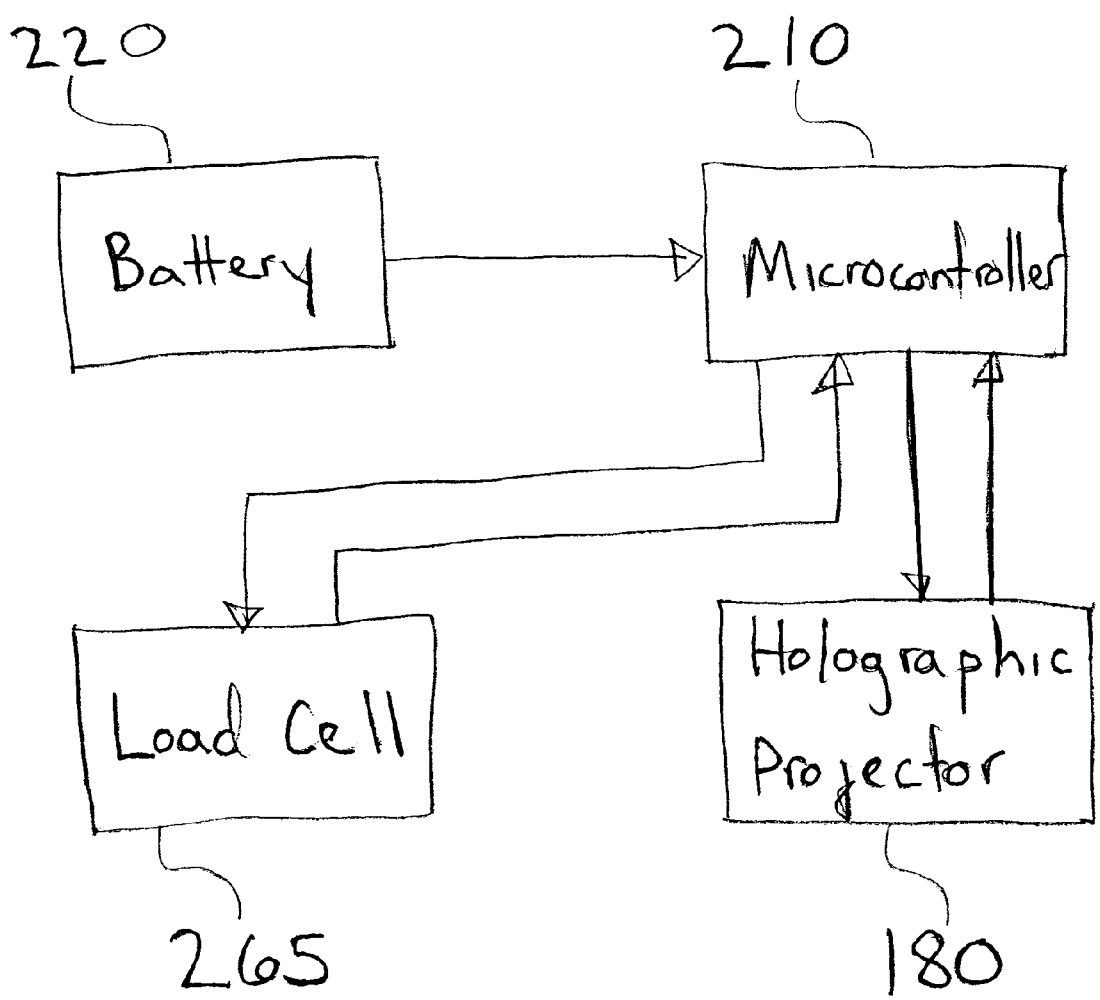
FIG. 3 is a block diagram indicating an exemplary operation of the exemplary weight scale.

FIG. 2 is a schematic block diagram of an exemplary embodiment of a circuit 200 for use in the scale 100. FIG. 3 depicts a block diagram indicating an exemplary operation of the scale 100. The circuit 200 may be contained within the enclosure 150 and may be implemented on a printed circuit board or the like. The circuit 200 may comprise, for example, a microcontroller 210 coupled to weight sensors 265, via circuitry 260, the optional display 170, the holographic projector 180, and a power supply 220. The microcontroller 210, which may be implemented on an individual integrated circuit, may include a central processing unit (CPU) 211, input and output (I/O) ports 213, read-only memory (ROM) 215, random-access memory (RAM) 217, and non-volatile memory (NVM) 219, such as electrically-erasable programmable ROM (EEPROM). The ROM 215 may contain program instructions that the CPU 211 executes to effectuate the operation of the circuit 200. The RAM 217 may be used to temporarily store intermediate results used by the CPU in the execution of the program instructions. The NVM 219 may be used to store data that are to be retained even when power is removed from the circuit. Such data may include user-related information such as a history of weight measurements, and/or user-identifying information.

The weight sensors 265 may be arranged, in a known way, adjacent to or in the feet 160 of the scale. The circuitry 260 may be coupled to the weight sensors 265 and may generate one or more signals that can be processed by the I/O apparatus of the microcontroller 210. Although the circuitry 260 can be implemented in a variety of ways, the implementation of this circuitry may be conventional. For example, in an exemplary embodiment, the circuitry 260 may generate an analog signal indicative of the weight sensed by the sensors 265 and the I/O block 213 of the microcontroller may include an analog-to-digital (A/D) converter. In an another embodiment, the circuitry 260 may include the A/D converter.

The microcontroller 210 may be coupled to and may control the display 170 in a known way. The microcontroller 210 also may control the activation of any back-lighting that the display 170 may have, as in the case of an LCD implementation. The microcontroller 210 may control each segment of the display 170 individually or may provide the display 170 with a three-digit number. The details of the interface between the microcontroller 210 and the display 170 are an implementational choice.

The microcontroller 210 also may be coupled to and may control the holographic projector 180. The microcontroller 210 may be programmed in accordance with the choice of holographic projector 180. For example, the holographic projector 180 may store pre-programmed images of numbers, characters, and symbols that are capable of being projected, and the microcontroller 210 may instruct the holographic projector 180 which of the numbers, characters, and symbols to project. The microcontroller 210 may also control the activation of any back-lighting that the holographic projector 180 may have. The details of the interface between the microcontroller 210 and the holographic projector 180 are an implementational choice.

In operation, the CPU 211 periodically may sample the I/O block 213 to determine whether a weight has been sensed by the sensors 265. If the CPU determines that a weight has been sensed, it may convert the detected signal into a weight measurement which it may provide to the display 170 for display. The CPU 211 also may cause the display 170, holographic projector 180, and/or any back-lighting to be activated so that the weight measurement image can be seen.

In an alternative embodiment, the microcontroller 210 can be placed initially in a sleep mode, so as to preserve power. The presence of a signal from the circuitry 260 can generate a wake-up signal that causes the microcontroller 210 to be activated. The microcontroller 210 may then activate the display 170 or holographic projector 180.

Once the user has stepped off the scale, the microcontroller 210 may then de-activate the display 170 and holographic projector 180. Such deactivation can occur, for example, an interval of time (1–30 seconds) after the user has stepped off the scale.

The power supply 220 may include, for example, batteries, a power outlet, solar cells, or the like. Batteries may be recharged by connection to, for example, a power outlet or by the solar cells. To add a stylish effect, the solar cells, which often appear bluish, shiny, and silvery, may be arranged within the upper surface 155 in a mosaic pattern or the like to mask their functionality with ornamentality.

A number of embodiments of the present invention have been described above. Nevertheless, it will be understood that various modifications may be made without departing from the spirit and scope of the invention. Accordingly, other embodiments may be within the scope of the following claims. It is intended that all matter contained in the above description or shown in the accompanying drawings shall be interpreted as illustrative and not in a limiting sense. It is also understood that the following claims are intended to cover all of the generic and specific features of the invention herein described and all statements of the scope of the invention, expressed or implied.

What is claimed is:

1. A scale comprising:
    a weight measurement device; and
    a holographic projector coupled to the weight measurement device;
    wherein the holographic projector projects a holographic image representative of a weight of an object placed on the scale.

2. The scale according to claim 1, further comprising a display coupled to the weight measurement device.

3. The scale according to claim 2, wherein the display further includes one of a light emitting diode (LED) panel and a liquid crystal display (LCD) panel.

4. The scale according to claim 2, wherein the holographic image is a three-dimensional rendering of data depicted by the display.

5. The scale according to claim 1, wherein the weight measurement device activates the holographic projector when weight is placed on the scale.

6. The scale according to claim 1, wherein the weight measurement device includes one of a load cell unit and strain gauge unit.

7. The scale according to claim 1, further comprising a control circuit coupled to the holographic projector and to the weight measurement device.

8. The scale according to claim 7, wherein the control circuit includes:
    a microcontroller coupled to the weight measurement device; and
    a power supply coupled to the microcontroller.

9. The scale according to claim 8, wherein the microcontroller includes:
    a central processing unit;
    an input/output interface; and
    a memory;
    wherein the memory includes executable instructions for predefined programs to be executed by the central processing unit.

10. The scale according to claim 9, wherein the memory includes a nonvolatile memory storing data when the weight measurement device is in an off state.

11. The scale according to claim 8, wherein the power supply includes solar cells.

12. The scale according to claim 1, further comprising a body fat measurement system coupled to the holographic projector and coupled to the weight measurement device.

13. The scale according to claim 1, wherein the holographic projector is detachable from the weight measurement device.

14. The scale according to claim 1, further comprising a retractable slide assembly attached to the holographic projector, wherein the retractable slide assembly may adjust a position of the holographic projector relative to a position of the weight measurement device.

* * * * *